(12) United States Patent
Shao

(10) Patent No.: US 8,354,823 B2
(45) Date of Patent: Jan. 15, 2013

(54) CHARGER

(75) Inventor: Dai-Wei Shao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 201 days.

(21) Appl. No.: 13/033,618

(22) Filed: Feb. 24, 2011

(65) Prior Publication Data

US 2012/0098482 A1 Apr. 26, 2012

(30) Foreign Application Priority Data

Oct. 22, 2010 (CN) .......................... 2010 1 0516266

(51) Int. Cl.
*H02J 7/00* (2006.01)
(52) U.S. Cl. ......... 320/113; 320/107; 320/111; 320/112
(58) Field of Classification Search .................... 320/113
See application file for complete search history.

(56) References Cited

U.S. PATENT DOCUMENTS

2007/0122693 A1* 5/2007 Qin et al. .......................... 429/97
2011/0156645 A1* 6/2011 Yang ............................. 320/110

* cited by examiner

*Primary Examiner* — Edward Tso
*Assistant Examiner* — Ahmed Omar
(74) *Attorney, Agent, or Firm* — Altis Law Group, Inc.

(57) ABSTRACT

A charger includes a base, a frame, a cover, and at least one spring. The base defines a groove. The frame defines at least one positioning member. The cover is capable of moving between a latched position and a unlatched position. The cover includes a latching tab and at least one limiting protrusion. The at least one spring provides a rebound force to the frame. When the cover is in the latched position, the latching tab is received in the groove, the at least one positioning member engages the at least one limiting protrusion, and the at least one spring is compressed by the frame. When the cover moves to the unlatched position, the latching tab disengages from the groove, the at least one positioning member disengages from the at least one limiting protrusion, causing the frame to be ejected upwardly by the at least one spring.

10 Claims, 4 Drawing Sheets

CHARGER

BACKGROUND

1. Technical Field

The present disclosure relates to chargers and, particularly, to a charger capable of tightly connecting the contacts of an electronic device or a battery.

2. Description of Related Art

A conventional charger for electronic devices typically includes a number of elastic contacts. After long time use, the elastic contacts may lose the elasticity. Then the contacts of the charger cannot make a tight connection with the corresponding contacts of a battery to be charged.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Embodiments of the present disclosure are now described in detail, with reference to the accompanying drawings.

Figure 1:
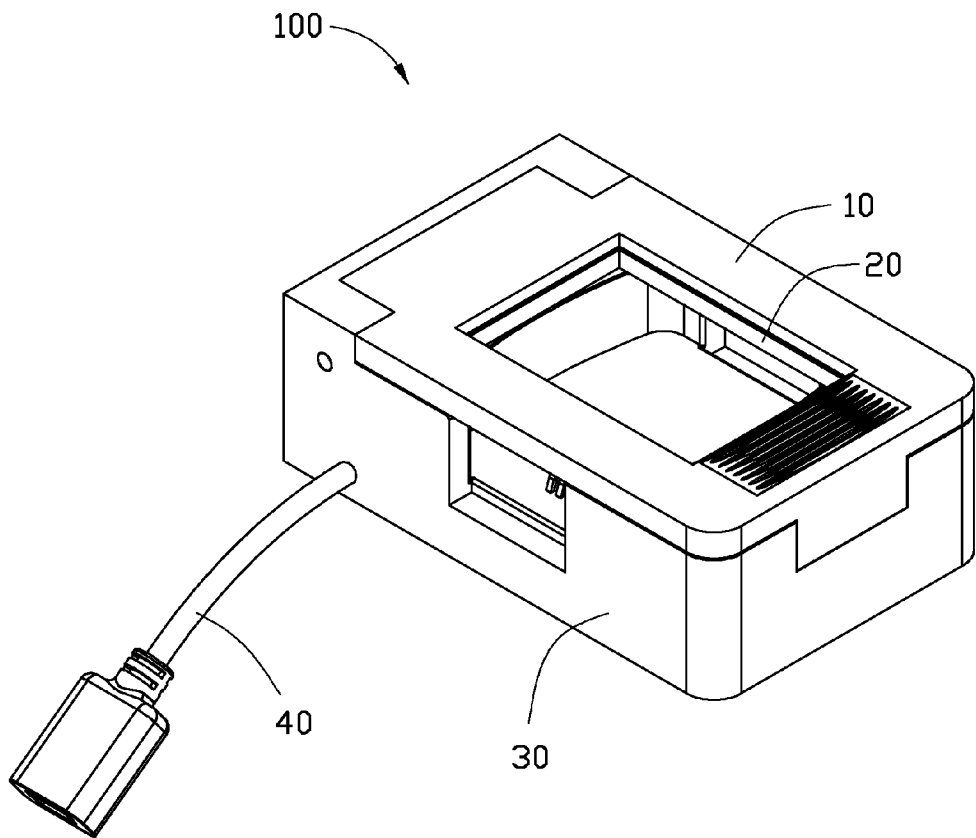
FIG. 1 is an isometric view of a charger in accordance with an exemplary embodiment.

Referring to FIG. 1, an isometric view of a charger 100 in accordance with an exemplary embodiment is shown. The charger 100 may be used to charge a battery or an electronic device. In the embodiment, the charger 100 is used to charge an electronic device, and the electronic device may be a wrist-worn electronic device. The charger 100 includes a cover 10, a frame 20, a base 30, and a cable 40. The cover 10 is slidably connected to the frame 20, and capable of being latched to the base 30. The frame 20 is rotatably connected to the base 30. A portion of the cable 40 extends out of the base 30 to couple with a power supply.

Figure 2:
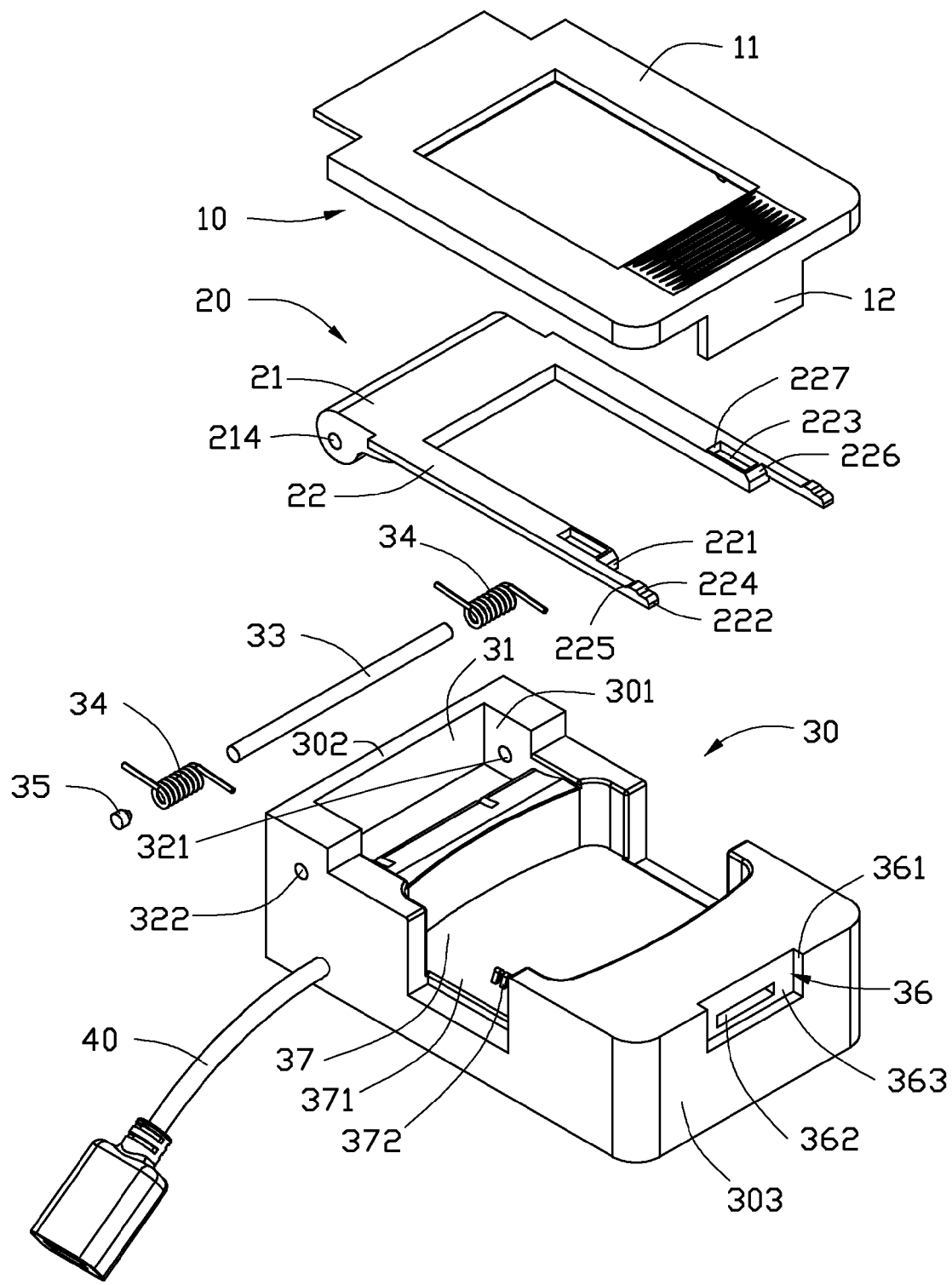
FIG. 2 is an exposed, isometric view of the charger of FIG. 1, viewed from a first perspective.
Figure 3:
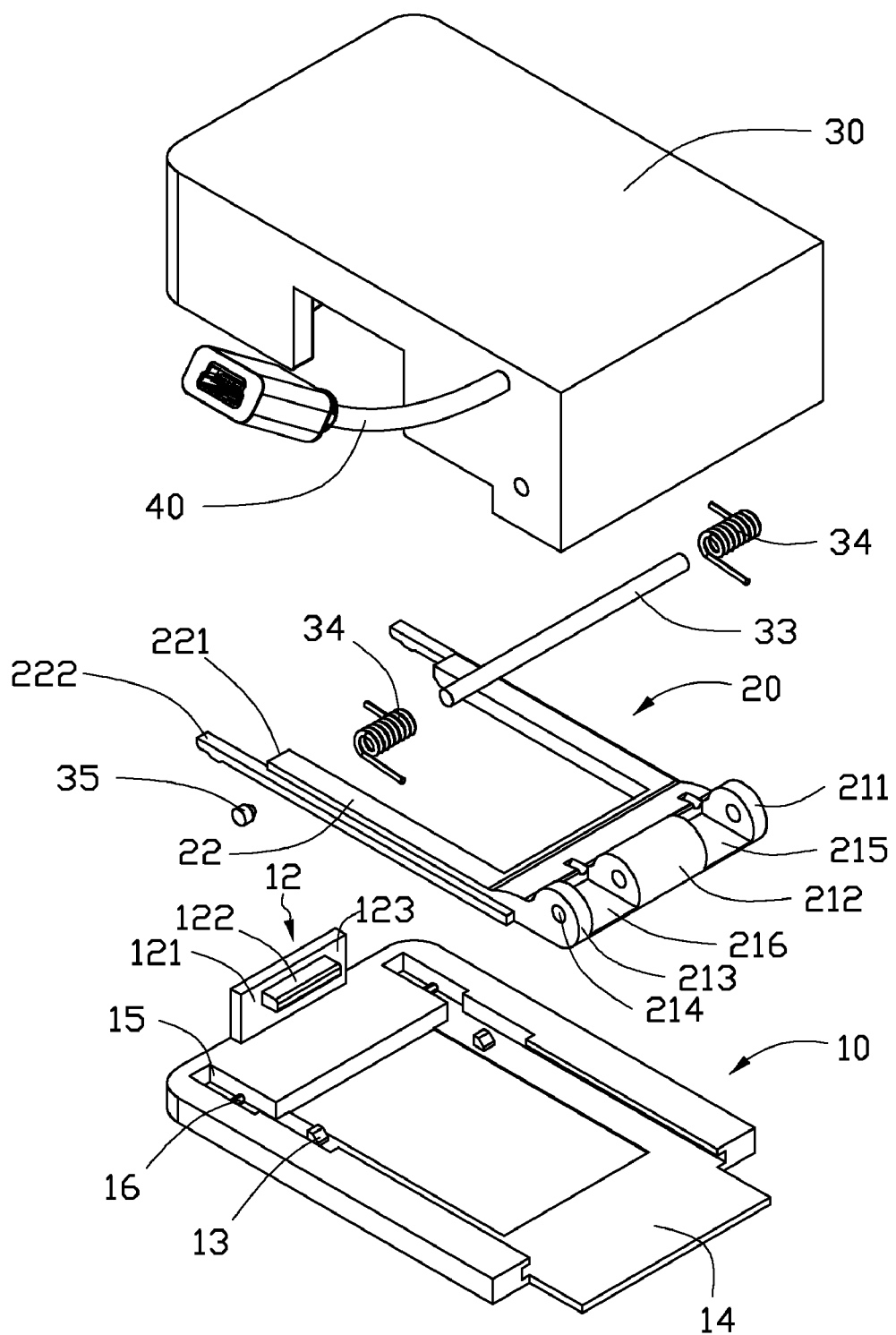
FIG. 3 is similar to FIG. 2, but viewed from a second perspective.

Referring to FIGS. 2-3, the cover 10 includes a plate 11 and a latching tab 12 protruding from one end of the plate 11. The latching tab 12 is configured to engage the base 30 to latch the cover 10 to the base 30. The latching tab 12 includes a first latching tab 121 and a second latching tab 122. The first latching tab 121 protrudes from one end of the plate 11. The second latching tab 122 protrudes from an inner side 123 of the first latching tab 121. In the embodiment, the shape of the first latching tab 121 and the second latching tab 122 is square. At least one limiting protrusion 13 protrudes from the lower surface 14 of the plate 10, and is adjacent to the latching tab 12. At least one positioning groove 15 is defined between the limiting protrusion 13 and the first latching tab 121. In the embodiment, the number of the limiting protrusions 13 and the positioning grooves 15 is two. The bottom of each positioning groove 15 includes a resisting protrusion 16.

The frame 20 includes a body portion 21 and at least one extending member 22. In the embodiment, the number of the extending member 22 is two. The extending members 22 extend from one end of the body portion 21. The free end of each extending member 22 includes a first end 221 and a second end 222. The distance between the first end 221 and the body portion 21 is less than that between the second end 222 and the body portion 21. Each extending member 22 defines a limiting groove 223 and a positioning member 224. The limiting groove 223 is defined adjacent to the first end 221. The positioning member 224 is formed adjacent to the second end 222. Each limiting groove 223 is configured to receive one limiting protrusion 13 of the cover 10. The limiting protrusion 13 is capable of moving in the limiting groove 223, enabling the cover 10 to move between a first position and a second position. One end of each positioning member 24 away from the second end 222 cooperates with the extending member 22 forms a hook 225. The hook 225 is configured to engage the resisting protrusion 16 to latch the cover 10 to the frame 20. When the cover 10 is pushed, the hook 225 disengages from the resisting protrusion 16, allowing the cover 10 to move relative to the frame 20.

In the embodiment, a first projection 211, a second projection 212, and a third projection 213 protrude from the bottom of body portion 21. The first projection 211, the second projection 212, and the third projection 213 extend along the length of the body portion 21 and separately define a through hole 214. The through holes 214 are coaxial. A first receiving space is defined between the first projection 211 and the second projection 212. A second receiving space is defined between the second projection 212 and the third projection 213. In other embodiments, the third projection 213 may be eliminated.

The base 30 includes two opposite sidewalls 301 and a sidewall 302 extending between the two opposite sidewalls 301. The two opposite sidewalls 301 and the sidewall 302 define a first receiving room 31 corresponding to the body portion 21. When the frame 20 is latched to the base 30, the first projection 211, the second projection 222, and the third projection 223 are received in the first receiving room 31. In the embodiment, two opposite sidewalls 301 each define a through hole 321 and a blind hole 322. In other embodiment, two opposite sidewalls 301 both define a through hole 321.

The base 30 further includes a shaft 33, at least one spring 34, and at least one resisting member 35. In the embodiment, the number of the springs 34 is two, each spring 34 is a torsion spring, and the number of the resisting member 35 is one. The shaft 33 extends through the through holes 214 of the first projection 211, the second projection 212, and the third projection 213. In the embodiment, one end of the shaft 33 is received in the through hole 321 of the sidewall 301, and the other opposite end of the shaft 33 is received in the blind hole 322 of the sidewall 301. In other embodiments, opposite ends of the shaft 33 may be respectively received in the through holes 321 of the sidewall 301. The springs 34 are sleeved on the shaft 33 and are respectively received in the first receiving space 215 and the second receiving space 216. One end of each spring 34 resists against the base 30, and the other opposite end resists on the body portion 21 of the frame 20. The resisting member 35 is received in the through hole 321 to resist against the end of the shaft 33 to hold the shaft 33 in the through hole 321.

A sidewall 303 of the base 30 opposite to the sidewall 302 defines a groove 36. The groove 36 is configured to receive the latching tab 12. The groove 36 includes a first groove 361 and a second groove 362. The first groove 361 is defined in the sidewall 303. The second groove 362 is defined in the bottom 363 of the first groove 361. The first groove 361 is configured to receive the first latching tab 121, and the second groove 362 is configured to receive the second latching tab 122. When the first latching tab 121 is received in the first groove 361 and the second latching tab 122 is received in the second groove 362, the cover 10 is latched to the base 30.

The base 30 further defines a second receiving room 37 in the middle of the base 30 to receive the electronic device. The bottom 371 of the second receiving room 37 includes a number of contacts 372 respectively electrically connected to the cable 40.

Figure 4:
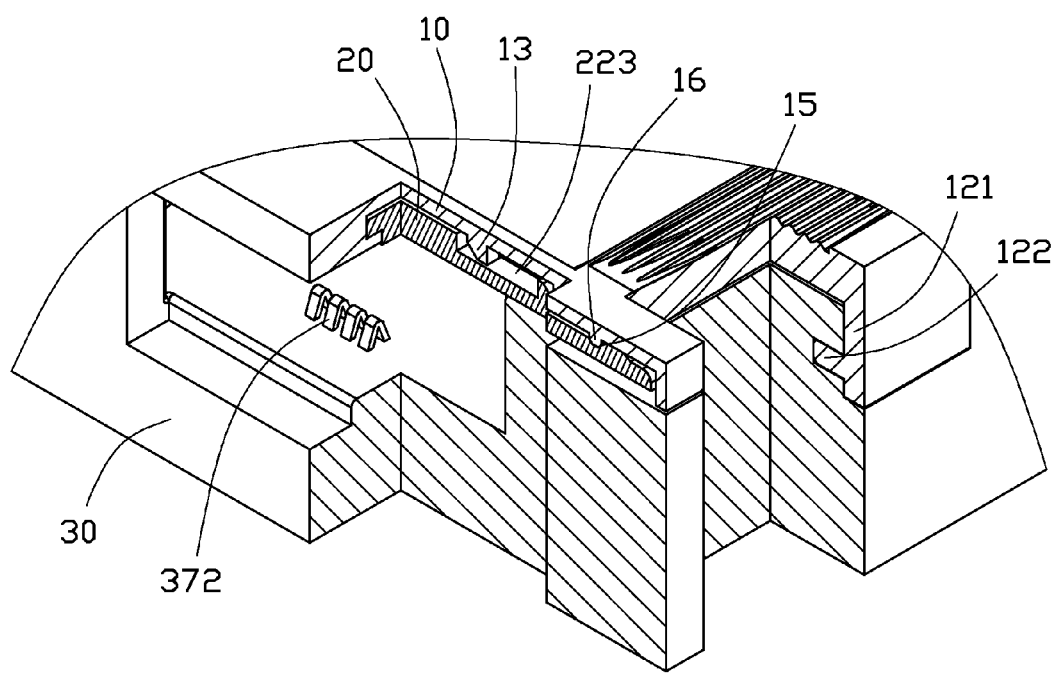
FIG. 4 is a partial, isometric, and cut-away view of the charger of FIG. 1.

Referring to FIG. 4, the first latching tab 121 is received in the first groove 361, the second latching tab 122 is received in the second groove 362, causing the cover 10 to be latched to the base 30. The limiting protrusion 13 resists against an upper edge 226 of the limiting groove 223. The hook 225 engages the resisting protrusion 16, causing the frame 20 to be latched to the base 30. The springs 34 are compressed by the frame 20. To open the charger 100, the cover 10 can be moved from a first latched position to a second unlatched position, until the limiting protrusion 13 resists against a lower edge 227 of the limiting groove 223. At this point, the first latching tab 121 disengages from the first groove 361, the second latching tab 122 disengages from the second groove 362, and the hook 225 disengages from the resisting protrusion 16. Thus, the frame 20 is ejected upwardly by the springs 34.

The electronic device can then be placed in the second receiving room 37, causing the contacts of the electronic device to contact the contacts 372 of the charger 100. The cover 10 and the frame 20 can then be rotated back until the frame 20 contacts the base 30. At this point, the springs 34 are compressed by the frame 20. The cover 10 is then pushed and moves from the second unlatched position to the first latched position. At this point, the limiting protrusion 13 resists against the upper edge 226 of the limiting groove 223, the first latching tab 121 is received in the first groove 361, the second latching tab 122 is received in the second groove 362, the hook 225 engages the resisting protrusion 16, causing the cover 10 and the frame 20 to be latched to the base 30. The cover 10 and the frame 20 provide a push to the electronic device, thus the contacts of the electronic device tightly contacts the contacts 372 of the charger 100.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A charger comprising:
   a base defining a groove;
   a frame rotatably connected to the base and defining at least one positioning member;
   a cover capable of moving between a latched position and a unlatched position, and comprising a latching tab to be received in the groove, and at least one limiting protrusion to engage with the at least one positioning member;
   at least one spring providing a rebound force to the frame when the cover being in the unlatched position;
   wherein when the cover is in the latched position, the latching tab is received in the groove, the at least one positioning member engages the at least one limiting protrusion, and the at least one spring is compressed by the frame; when the cover moves to the unlatched position, the latching tab disengages from the groove, the at least one positioning member disengages from the at least one limiting protrusion, and the frame is ejected upwardly by the at least one spring.

2. The charger as described in claim 1, wherein the latching tab comprises a first latching tab and a second latching tab, the first latching tab protrudes from one end of the cover, the second latching tab protrudes from an inner side of the first latching tab, the groove comprises a first groove and a second groove, the first groove is defined in a sidewall of the cover, the second groove is defined in the bottom of the first groove, the first groove is configured to receive the first latching tab, the second groove is configured to receive the second latching tab.

3. The charger as described in claim 1, wherein at least one limiting protrusion protrudes from the lower surface of the cover, the frame defines at least one limiting groove to receive the limiting protrusion, when the cover is in the latched position, the at least one limiting protrusion resists against the upper edge of the at least one limiting groove, when the cover is in the unlatched position, the at least one limiting protrusion resists against the lower edge of the at least one limiting groove.

4. The charger as described in claim 3, wherein the frame comprises a body portion and at least one extending member, the at least one extending member extends from at least one end of the body portion, the at least one limiting groove and the at least one positioning member are arranged on the at least one extending member.

5. The charger as described in claim 1, wherein the body portion defines at least one through hole, two opposite sidewalls of the base each define a through hole and a blind hole, the base further comprises a shaft and a resisting member, the shaft extends through the at least one though hole, and the ends of the shaft are separately received in the through hole of the sidewall and the blind hole of the sidewall, the resisting member is received in the through hole and resists the end of the shaft.

6. The charger as described in claim 5, wherein each of the at least one spring is sleeved on the shaft, each of the at least one spring is a torsion spring, one end of the torsion spring resists against the base, the other opposite end of the torsion spring resists against the frame.

7. The charger as described in claim 1, wherein at least one first projection and a second projection protrude from the lower surface of the body portion, the at least one first projection and the second projection cooperatively define at least one receiving space to receive the at least one spring.

8. The charger as described in claim 7, wherein the base comprises two opposite sidewalls and a sidewall extending between the two opposite sidewalls, which cooperatively define a first receiving room to receive the at least a first projection and the second projection.

9. The charger as described in claim 1, wherein the base further defines a second receiving room to receive an electronic device, the bottom of the second receiving room comprises a plurality of contacts capable of contacting contacts of the electronic device.

10. The charger as described in claim 9, further comprising a cable electrically connected to the contacts of the charger.

* * * * *